United States Patent [19]

Blaskiewicz et al.

[11] 4,137,350

[45] Jan. 30, 1979

[54] PAINTED EXTERIOR AUTOMOTIVE BODY PARTS

[75] Inventors: Arthur A. Blaskiewicz, Danbury; Julian M. Mitchell, New Haven, both of Conn.

[73] Assignee: Uniroyal, Inc., New York, N.Y.

[21] Appl. No.: 772,372

[22] Filed: Feb. 25, 1977

Related U.S. Application Data

[63] Continuation-in-part of Ser. No. 613,695, Sep. 15, 1975, abandoned.

[51] Int. Cl.$^2$ ............................ C08L 9/02; C08L 9/06
[52] U.S. Cl. ........................................ 428/31; 260/889; 260/42.33; 260/42.32; 260/33.6 AQ
[58] Field of Search ................... 260/889, 887; 428/31

[56] References Cited

U.S. PATENT DOCUMENTS

| | | | |
|---|---|---|---|
| 3,451,962 | 6/1969 | Auler et al. | 260/33.6 |
| 3,646,168 | 2/1972 | Barrett | 260/889 |
| 3,646,169 | 2/1972 | Wirth | 260/889 |
| 3,678,135 | 7/1972 | Mastromatteo et al. | 260/889 |
| 3,706,819 | 12/1972 | Usamoto et al. | 260/889 |
| 3,873,348 | 3/1975 | Reilly et al. | 260/33.6 QA |
| 3,897,405 | 7/1975 | Son et al. | 260/889 X |
| 3,937,763 | 2/1976 | Ogura et al. | 260/889 |
| 4,008,190 | 2/1977 | Taylor et al. | 260/5 |
| 4,020,038 | 4/1977 | O'Mahoney, Jr. | 260/889 X |
| 4,031,166 | 6/1977 | Bronstert et al. | 260/876 B |

*Primary Examiner*—Carman J. Seccuro
*Attorney, Agent, or Firm*—James J. Long

[57] ABSTRACT

Painted exterior automotive body parts made of blends of EPM or EPDM type elastomers with highly unsaturated rubbers, vulcanized to provide vulcanizates having high flexural modulus (from 7,000 to 45,000 psi), using high sulfur levels (6 to 12 parts per 100 parts by weight of elastomers).

3 Claims, No Drawings

PAINTED EXTERIOR AUTOMOTIVE BODY PARTS

This application is a continuation-in-part of our copending application Ser. No. 613,695 filed Sept. 15, 1975 now abandoned.

This invention relates to painted exterior automotive body parts.

Blending of elastomers to obtain desirable combinations of properties has been practiced in the rubber industry for a number of years. Thus, representative disclosures of blends of monoolefin copolymer type elastomers (EPM or EPDM) with highly unsaturated rubbers include U.S. Pat. Nos. 3,451,962, Auler et al. June 24, 1969; 3,492,370, Wirth, Jan. 27, 1970; 3,492,371, Barrett, Jan. 27, 1970; 3,646,168, Barrett, Feb. 29, 1972; 3,646,169, Wirth, Feb. 29, 1972; 3,678,135, Mastromatteo et al., July 12, 1972; 3,706,819, Usamoto et al., Dec. 19, 1972; and 3,873,348, Reilly et al., Mar. 25, 1975. Unfortunately, prior blends of monoolefin copolymer elastomers with highly unsaturated rubbers have not provided vulcanizates having the combination of physical properties desired in certain exterior automotive body parts, particularly tensile strength and hardness in combination with high flexural modulus.

It is conventional to make hard rubber (ebonite) from natural rubber or styrene-butadiene elastomers by bulcanization with high amounts of sulfur, for the manufacture of bowling balls, combs, and a variety of hard rubber products. However, such vulcanizates do not provide the combination of properties sometimes desired in certain applications, such as exterior automobile body parts.

In accordance with the present invention, it has now been found that blends of monoolefin copolymer rubbers of low unsaturation with highly unsaturated rubbers can be vulcanized with higher amounts of sulfur than conventionally used, to provide vulcanizates having a highly desirable combination of properties, notably tensile strength and hardness, and especially high flexural modulus. Furthermore the resulting vulcanizates can be painted by conventional methods, and the paint is found to adhere well.

Whereas blends of monoolefin copolymer rubbers with highly unsaturated elastomers cured according to the teachings of the prior art usually afforded flexural modulus values of the order of about 3,000 psi maximum, the instant method, using high-sulfur cure, provides paintable elastomeric compositions having a flexural modulus of from 7,000 to 45,000 psi.

The invention is, as indicated, concerned with the curing or vulcanization of blends of (A) monoolefin copolymer elastomers of low unsaturation with (B) highly unsaturated elastomers. The weight ratio of (A) monoolefin copolymer elastomer to (B) highly unsaturated rubber in the blends of the invention may vary from 70/30 to 85/15. The monoolefin copolymer elastomer (A) may be a saturated copolymer of (a) ethylene with (b) a monoolefin having the structure $CH_2=CH-R$ wherein R is an alkyl radical having from 1 to 12 carbon atoms (e.g., propylene, pentene-1 octene-1 etc.). Alternatively the monoolefin copolymer elastomer (A) may be an unsaturated copolymer derived from the said monoolefinic monomers (a) and (b), along with a copolymerizable polyene (c) in amount up to 15% based on the weight of the copolymer. The ratio of (a) ethylene to (b) monoolefin of the formula $CH_2=CH-R$ is ordinarily within the range of from 90/10 to 50/50, by weight. When a polyene (c) is used, it is usually employed in amount of at least 1% on the weight of the polymer. Particularly suitable polyenes for making the unsaturated type of monoolefin terpolymer rubber are the non-conjugated dienes as represented by such open chain diolefins as 1,4-hexadiene, or as represented by the cyclic dienes, especially bridged ring dienes, such as dicyclopentadiene or the alkylidenenorbornenes having from 9 to 13 carbon atoms such 5-ethylidene- 2-norbornene, frequently present in amount of from 3 to 15%, based on the weight of the terpolymer. Saturated ethylene-propylene type elastomers are frequently referred to as EPM while the unsaturated types are ordinarily referred to as EPDM. The prior patents mentioned above contain further descriptions of the monoolefin copolymer rubbers useful in this invention; these rubbers are of course used in ungrafted form, unlike U.S. Pat. No. 3,897,405, Son et al., July 29, 1975.

The highly unsaturated elastomer (B) which is blended with the monoolefin copolymer type rubber (A) in accordance with the invention may be any conjugated diolefin polymer rubber, whether a homopolymer as in cis-polyisoprene (natural or synthetic), polybutadiene (including polybutadiene of high cis content), polychloroprene, etc., or a copolymer containing at least 50% by weight of such conjugated diolefin copolymerized with a monoethylenically unsaturated monomer, as in butadiene-styrene copolymer, butadiene-acrylonitrile copolymer, and the like, either solution prepared or emulsion prepared, stereo-specific or otherwise.

As indicated, the invention achieves a surprising new combination of desirable physical properties in the described blend, while making possible remarkably good adhesion of paint to articles made from the blend, by vulcanizing the blend with an unusually high concentration of sulfur as the curing agent. The amount of sulfur employed in making the new blends of the invention ranges from 6 to 12 parts, preferably 7 to 11 parts, per 100 parts by weight of monoolefin copolymer rubber (A) plus highly unsaturated rubber (B) in the blend. Along with the sulfur, conventional organic accelerators of sulfur vulcanization are used, in conventional amounts. In many cases it is desirable to further include in the blend other compounding ingredients, notably reinforcing filler, especially carbon black, in conventional amounts. The cure is effected by heating the blend to conventional elevated vulcanizing temperature, for a time sufficient to bring about vulcanization in accordance with conventional practice. Within the compositional ranges stated the sulfur level may be selected to provide cured blends having desired physical properties, which in the reinforced blends particularly, include exceptionally high flexural modulus. In addition, especially within the preferred range of sulfur concentrations, the degree of paint adhesion is greatly enhanced.

The blended composition of the invention may further contain other suitable compounding ingredients including zinc oxide activator, other particulate fillers such as silica, extender oil, etc.

The blends of the invention may be prepared by any conventional means such as an internal mixer (e.g., a Banbury [trademark]) or an open roll mill. Usually masterbatches of the rubbers are prepared in the absence of curatives using a Banbury at a mixing temperature of from 250° F. to 320° F. The masterbatches are sheeted off a two-roll mill and cooled. Curatives (sulfur and accelerator) may then be added to the blended masterbatches at normal rubber processing temperatures not to exceed 250° F. to preclude premature cure.

Alternatively, the rubbers and the curatives may be charged simultaneously and mixed at normal rubber processing temperatures in a suitable internal mixer, at a temperature not in excess of 250° F. If desired, the compound may then be refined on a cold mill.

The composition may be cured in a desired shape using any of the well known methods such as compression or injection molding, or open steam vulcanization. As in conventional practice, cure in a mold may be followed if desired by a post cure outside the mold.

The compositions of this invention excel in their ozone resistance and weatherability due to the high EPDM rubber contents and they combine these desirable properties, particularly in the reinforced state, with exceptionally high flexural modulus which enhances resistance to fluttering and sagging yet maintain a high degree of elastomeric recovery upon deformation. Cured and painted articles made from the reinforced rubber compositions of this invention exhibit remarkable adhesion of the paint to the rubber substrate without the need of ultraviolet irradiation of the surface of the article.

The non-filled or non-reinforced blends when cured according to this invention have many practical uses such as hose covers, seals for concrete water piping, tubing, shoe heels, etc. Blends containing carbon black or other suitable reinforcing agents may be employed in uses where high tensile strength, high modulus and especially high flexural modulus are required such as splash panels, bumper strips, window seals, drum covers, solid tires for lawn mower wheels and the like.

The cured and painted articles have a combination of properties which renders them especially useful as exterior automobile body parts, particularly filler structures such as sight shields, various bumper products, fender extensions, filler and facia panels, hoods, trunk lids, etc.

Any suitable conventional flexible automotive finish may be employed for painting the cured shaped articles of the invention. If desired a conventional prime coating may be applied prior to a final finishing coating of a desired color. Application of these coatings may be by any suitable method such as spraying, brushing, rolling, dipping, or electrostatic deposition. Frequently, the coating composition is based on a synthetic polymer resin, such as a polyurethane, a polyester, an acrylic polymer, or a combination thereof. For example, any of the various paints described in U.S. Pat. No. 3,764,370, Bragole, Oct. 9, 1973 or referred to in the above-mentioned U.S. Pat. No. 3,873,348 may be used. Flexible resin-based paints based on acrylic resins, alkyd resins, polyester resins, polyurethanes and plasticized nitrocellulose lacquer resin paints, as is disclosed in U.S. published patent application B No. 324,495, Tarney et al., Jan. 18, 1975 or in General Mills Chemicals, Inc. Bulletin No. IV-H-2f, may be used.

Prior to painting, the surface of the vulcanized article is prepared to receive the paint in the conventional manner. Activation of the surface of the cured article prior to painting may be undertaken in accordance with conventional practice, using such well known methods as oxidation treatment or surface chlorination. Thus, oxidation treatment or acid etching may typically be carried out for example by immersing the article for 30 seconds in a 1.4% aqueous chromic acid ($Cr^{+5}$) bath at 140° F., followed by rinsing (in the examples below treatment (A) thus uses a Seibert Oxidermo [trademark] flash primer wetting and solvent flash off and treatment (B) uses such a MacDermid [trademark] etch followed by rinsing). Chlorination treatment (indicated as treatment (C) in the examples below) may be accomplished for example by immersing the object for 5 minutes at room temperature in a mixture containing a 5.25% sodium hypochlorite solution, 10 parts of water and 0.5 part of 85% hydrochloric acid. Other methods for activating the surface are known as the flame treatment and corona discharge processes. The sensitizing method disclosed in U.S. Pat. No. 3,764,370 referred to above amy also be employed if desired. A remarkable feature of the invention resides in the fact that with the described high sulfur vulcanizates, ultraviolet irradiation of the surface of the article is not necessary for good adhesion of paint.

Before treating the vulcanized blend surface, care must be taken, as in usual practice, to thoroughly remove any surface contamination such as dirt, grease, mold release, etc. This is usually done by solvent wiping, spraying or dipping. Suitable solvents are hexane, toluene, petroleum naphtha, etc. An alternative method is a hot detergent wash followed by a rinse.

As emphasized above, an important feature of the invention resides in the fact that it makes possible the blending of EPDM type rubber with highly unsaturated rubbers to yield, when cured at high sulfur levels as described, flexural modulus values of from 7,000 to 45,000 psi in the co-cured blend. The 10% modulus is also useful in characterizing the improved vulcanized blend of the invention; 10% modulus data provide an assessment of the flexural modulus. The 10% modulus may be from 100 to 1800 psi. A range of 200 to 1700 psi is most preferred.

The co-cured blends of the invention have elongation (ultimate elongation; elongation at break) of from 25% to 250%.

The following examples will serve to illustrate the practice of the invention in more detail. In the tables accompanying the examples, all quantities of ingredients are expressed as parts by weight. The 10% modulus is the stress required to produce 10% elongation, expressed in psi (pounds per square inch). The tensile is the tensile strength, expressed in psi. The elongation is the elongation at break, expressed in percent. The hardness is the Shore A Durometer (trademark) hardness. The flexural modulus (determined at room temperature, as are all the other physical properties except viscosity) is expressed as $10^5$ psi. Tear strength is measured with die C, and expressed as ppi (pounds per inch). In the examples various surface sensitizing pretreatments are employed, identified as (A) Seibert Oxidermo oxidation, (B) MacDermid acid etching and (C) chlorination as described above.

In the working examples below adhesive strengths were determined by the following Ford Motor Company Quality Control Laboratory test methods:

| | |
|---|---|
| Cross hatch adhesion | MJ-BI-6-1 |
| Thermal shock | MJ-BI-7-3 |
| Resistance to galvanic action | ESB-M2P105-B |
| Water immersion | MJ-BI-4-1 |

EXAMPLE I

The example evaluates, in Table I, 80/20 EPDM/SBR blends containing no reinforcing carbon black or extender oil.

The ingredients used in this Example are as follows:

EPDM-I has an ethylene/propylene ratio of 57/43 by weight and an ENB (5-ethylidene-2-norbornene) content of 10% by weight, intrinsic viscosity 1.7 in tetralin at 135° C., Mooney viscosity 50 ML-4 at 257° F. The SBR is SBR 1500 having a styrene content of 23%, Mooney viscosity 52 ML-4 at 212° F. The accelerators are: Delac (trademark) S, N-cyclohexyl-2-benzothiazole sulfenamide; MBTS, 2,2-benzothiazyldisulfide; DPG, diphenylguanidine. The ingredients were charged to a type B Banbury, No. 2 speed, water on. All the ingredients were charged initially, the ram was lowered when a temperature of 220° F. was reached, and the batch discharged at a temperature of 250° F. The stock was sheeted off on a cool two-roll mill.

0.080 Gauge stock was cut into 2" × 9" strips for compression molding of tensile specimens 2" × 9" × 0.075", cured for 8 minutes at 360° F. in the mold, followed by a post cure in air for 2½ hours at 250° F.

TABLE 1

EXAMPLE I--UNFILLED EPDM/SBR BLENDS

| Stock: | I-1 | I-2 | I-3 |
|---|---|---|---|
| Recipe | | | |
| EPDM-I | 80 | 80 | 80 |
| SBR | 20 | 20 | 20 |
| ZnO | 5 | 5 | 5 |
| Delac S | 1.5 | 1.5 | 1.5 |
| MBTS | 0.5 | 0.5 | 0.5 |
| DPG | 0.5 | 0.5 | 0.5 |
| Sulfur | 6.0 | 8.0 | 12.0 |
| Physical Properties after cure, 8 minutes at 182° C. | | | |
| 10% Modulus | 100 | 230 | 310 |
| Tensile | — | 1850 | 1810 |
| Elongation | 250 | 240 | 150 |
| Hardness | 57 | 72 | 74 |
| Physical Properties after post-cure, 90 minutes at 120° C. | | | |
| 10% Modulus | 150 | 160 | 270 |
| Tensile | 1570 | 1980 | 2420 |
| Elongation | 250 | 220 | 190 |
| Hardness | 68 | 75 | 76 |

EXAMPLE II

The following recipe is used in this example to make the stocks shown in Table II, below. The ingredients and procedures are as described in Example I. The carbon black is FEF N550. The extender oil is petroleum hydrocarbon paraffinic oil Sunpar (trademark) 150, having an SUS viscosity of 508 at 100° F.

| Ingredients | Recipe Parts by Weight |
|---|---|
| EPDM-I | 80.0 |
| SBR | 20.0 |
| Carbon black | 110.0 |
| Extender oil | 45.0 |
| Zinc oxide | 5.0 |

-continued

| Ingredients | Recipe Parts by Weight |
|---|---|
| Stearic acid | 1.0 |
| Delac S | 1.5 |
| MBTS | .5 |
| DPG | .5 |
| Sulfur | Variable (See Table II) |

150 Gauge stock was cut into squares approximately 11" × 11" for compression molded paint plaques 12" × 12" × 0.127", cured 8 minutes at 360° F. in the mold followed by a post cure in air for 1½ hours at 250° F.

These plaques were treated in the following manner:

After 24 hours aging at room temperature, the plaques were solvent wiped with toluene to remove any residual mold release and any dirt picked up during the post cure.

In this series a Seibert Oxidermo (trademark) flash primer, as described in surface activation treatment (A) above, was applied to the cured test plaques by spray coating and allowed to air dry approximately 10 minutes before painting with a polyurethane-based primer coating (PPG Durethane [trademark] 600 grey primer DEM No. 32906) followed by a white top coat polyurethane-based enamel (PDG Durathane 100 No. 3967) according to the following schedule:

Primer Coat Application
1. Spray coat 0.7 to 1.0 mil dry film.
2. Flash solvent off 5 min.
3. Bake 20 min. at 250° F.
4. Allow plaque to cool to a maximum of 130° F. before applying top coat.

Top Enamel Application
1. Spray coat 0.6 mil dry film.
2. Flash 2 to 3 min.
3. Spray coat 0.6 mil dry film.
4. Flash solvent 2 to 3 min.
5. Spray coat 0.6 mil dry film.
6. Flash 10 min.
7. Bake 40 min. at 250° F.

The physical properties of the cured blends, and the changes in properties upon aging, are given in Table II, along with the paint adhesion test results, wherein "O.K." indicates no separation from the substrate and "F" indicates failure by separation of the paint.

The data show that these blends have exceptionally high flexural modulus at a sulfur level from 6 to 12 parts (per 100 parts by weight of the two blended polymers) and particularly at a sulfur level from 7 to 11 parts while maintaining high tensile strength and satisfactory elongation.

The high flexural strength is most desirable in applications where high deformation forces are encountered. Yet the elastomeric properties ensure recovery of the deformed material to its original shape.

As far as paint adhesion is concerned, none of the samples failed the cross hatch, water immersion and galvanic action tests.

TABLE II

EXAMPLE II EPDM-SBR BLENDS CURED AT VARIOUS SULFUR LEVELS

| Stock: | II-1 | II-2 | II-3 | II-4 | II-5 | II-6 | II-7 |
|---|---|---|---|---|---|---|---|
| Variable--Sulfur | 6.0 | 7.0 | 8.0 | 9.0 | 10.0 | 11.0 | 12.0 |
| Compounded Mooned Viscosity, ML-4 at 212° F | 61 | 62 | 67 | 59 | 58 | 59 | 59 |
| Cure 8' at 360° F--Post Cure 1½ hours at 250° F (oven) | | | | | | | |
| 10% Modulus | 350 | 480 | 500 | 610 | 680 | 680 | 620 |
| Tensile | 2080 | 2040 | 2140 | 2030 | 1860 | 2090 | 1990 |
| Elongation | 120 | 110 | 90 | 100 | 80 | 90 | 85 |

TABLE II-continued

| EXAMPLE II EPDM-SBR BLENDS CURED AT VARIOUS SULFUR LEVELS | | | | | | | |
|---|---|---|---|---|---|---|---|
| Stock: | II-1 | II-2 | II-3 | II-4 | II-5 | II-6 | II-7 |
| Hardness | 90 | 94 | 95 | 95 | 95 | 94 | 94 |
| Flexural Modulus | .13 | .20 | .24 | .25 | .35 | .35 | .32 |
| Aged 70 hours, at 212° F. | | | | | | | |
| Tensile, % change | −18 | −16 | −33 | −4 | −4 | −7 | −9 |
| Elongation, % change | −50 | −27 | −11 | −25 | −14 | −22 | −12 |
| Hardness, points change | +4 | +3 | +3 | +3 | +6 | +1 | +3 |
| Tests for Paint Adhesion | | | | | | | |
| Cross Hatch | OK | OK | OK | OK | OK | OK | OK |
| Water Immersion | OK | OK | OK | OK | OK | OK | OK |
| Galvanic Action | OK | OK | OK | OK | OK | OK | OK |
| Thermal Shock | OK | OK | OK | OK | OK | OK | OK |

EXAMPLE III

The same procedure and ingredients as in Example II were employed, except that the blends were compounded at EPDM/SBR ratios and sulfur levels as indicated in Table III. Instead of activating the surface of the paint test plaques by the Oxidermo treatment (A), the plaques were activated by the above described halogenation (C) and acid etch (B) pretreatments with the results indicated in Table III.

TABLE III

| EXAMPLE III--EPDM-SBR BLENDS AT VARYING RATIOS | | |
|---|---|---|
| Variables | III-1 | III-2 |
| EPDM-I | 80 | 70 |
| SBR | 20 | 30 |
| Sulfur | 7 | 11 |
| Mooney Vis. ML-4 at 212° F. | 60 | 56 |
| Cure 8' at 360° F. Post Cure 1½ hours at 250° F. | | |
| 10% Modulus | 750 | 1750 |
| Tensile | 1830 | 1860 |
| Elongation | 75 | 25 |
| Hardness | 95 | 98 |
| Flexural modulus | .16 | .35 |
| Age 70 hours at 212° F. | | |
| Tensile, % change | +1 | +5 |
| Elongation, % change | +6 | +40 |
| Hardness, points change | +4 | +1 |
| Test for Pain Adhesion | | |
| Surface Sensitizer | (C) Halogenation | |
| Cross Hatch | OK | OK |
| Water Immersion | OK | OK |
| Galvanic Action | OK | OK |
| Thermal Shock | OK | OK |
| Surface Sensitizer | (B) MacDermid Etch | |
| Cross Hatch | OK | OK |
| Water Immersion | OK | OK |
| Thermal Shock | OK | OK |

EXAMPLE IV

The same procedures and ingredients as in Example II are employed at sulfur levels of 8 and 12 parts.

Sample surfaces were treated using the Seibert Oxidermo method (A).

The data on these samples are given in Table IV.

TABLE IV

| EXAMPLE IV--EPDM-SBR BLENDS AT VARIOUS RATIOS AND SULFUR LEVELS | | | | |
|---|---|---|---|---|
| Variables | IV-1 | IV-2 | IV-3 | IV-4 |
| EPDM-I | 80 | 70 | 80 | 70 |
| SBR | 20 | 30 | 20 | 30 |
| Sulfur | 8 | 8 | 12 | 12 |
| Mooney Vis., ML-4 at 212° F | 63 | 62 | 49 | 57 |
| Cure 8' at 360° F. Post Cure 1½ hours at 250° F. | | | | |
| 10% Modulus | 850 | 650 | 1050 | 1700 |
| Tensile | 1840 | 1755 | 1750 | 1780 |
| Elongation | 75 | 60 | 55 | 30 |
| Hardness | 96 | 95 | 97 | 98 |
| Flexural modulus | .27 | .17 | .51 | .55 |
| Sensitizer (A) Seibert Oxidermo | | | | |
| Cross Hatch | OK | OK | OK | OK |
| Water Immersion | OK | OK | OK | OK |
| Galvanic Action | OK | OK | OK | OK |
| Thermal Shock | OK | OK | OK | OK |

EXAMPLE V

The procedure and ingredients are the same as in Example II, using an 80/20 ratio of EPDM to highly unsaturated rubber, except that various highly unsaturated rubbers are substituted for the SBR, as indicated in Table V, where the symbols for the highly unsaturated elastomers have the following meanings: NR is natural pale crepe rubber; NBR is butadiene-acrylonitrile copolymer rubber, 32.5% acrylonitrile, Mooney viscosity 45 ML 1 + 4 at 212° F.; BR is cis-polybutadiene, 45 ML 1 + 4 at 212° F.; CR is polychloroprene elastomer, 50 ML 1 + 4 at 212° F. The paint plaques were sensitized using Oxidermo (A), acid etch (B) or chlorination (C) treatments as described above.

It will be seen clearly from the results tabulated in Table V that in blends in which other highly unsaturated elastomers replace SBR, high sulfur level produces the desired flexural modulus while maintaining a good level of the other physical properties.

Paint adhesion essentially parallels the findings in 80/20 EPDM/SBR blends.

TABLE V

| EXAMPLE V EPDM BLENDS WITH OTHER HIGHLY UNSATURATED ELASTOMERS | | | | |
|---|---|---|---|---|
| Variables | V-1 | V-2 | V-3 | V-4 |
| EPDM-I | 80 | 80 | 80 | 80 |
| NR | 20 | — | — | — |
| NBR | — | 20 | — | — |
| BR | — | — | 20 | — |
| CR | — | — | — | 20 |
| Sulfur | 7 | 7 | 7 | 7 |
| Mooney Vis., ML-4 at 212° F. | 62 | 68 | 67 | 69 |
| Cure 8' at 360° F. Post Cure 1½ hours at 250° F. | | | | |
| 10% Modulus | 380 | 875 | 320 | 245 |
| Tensile | 1400 | 1610 | 1650 | 2240 |
| Elongation | 150 | 100 | 100 | 100 |
| Hardness | 90 | 95 | 87 | 86 |
| Flexural Modulus | .10 | .37 | .1 | .08 |

TABLE V-continued
EXAMPLE V EPDM BLENDS WITH OTHER HIGHLY UNSATURATED ELASTOMERS

| Variables | V-1 | V-2 | V-3 | V-4 |
|---|---|---|---|---|
| Aged 70 hours at 212° F. | | | | |
| Tensile strength, % change | −3 | +11 | −1 | −1 |
| Elongation, % change | −27 | −5 | 0 | −33 |
| Hardness, point change | +4 | +1 | +11 | +7 |
| Tests for Paint Adhesion | | | | |
| Surface Activation | | (B) MacDermid Etch | | |
| Cross Hatch | OK | OK | OK | OK |
| Water Immersion | F | OK | OK | OK |
| Thermal Shock | OK | OK | OK | OK |
| Surface Activation | | (A) Seibert Oxidermo | | |
| Cross Hatch | OK | OK | OK | OK |
| Water Immersion | OK | OK | OK | OK |
| Galvanic Action | OK | OK | OK | OK |
| Thermal Shock | OK | OK | * | * |
| Surface Activation | | (C) Halogenation | | |
| Cross Hatch | OK | OK | OK | OK |
| Water Immersion | OK | OK | OK | OK |
| Galvanic Action | OK | OK | OK | OK |
| Thermal Shock | OK | OK | OK | OK |

*Surface contamination caused failure.

EXAMPLE VI

This example illustrates the practice of the invention in high modulus automobile bumper compound.

Four stocks are prepared according to the recipe given in Table VI-A, using three different EPDM's blended with SBR. EPDM-I is as identified in Example I. EPDM-II and EPDM-III have the following characteristics:

| EPDM: (% by weight) | II | III |
|---|---|---|
| Ethylene | 53 | 75 |
| Propylene | 42 | 21 |
| ENB | 5 | 4 |
| Intrinsic viscosity in tetralin at 135° C. | 1.6 | 1.6 |
| ML-4 (at temp.) | 52 (100° C) | 63 (120° C) |

In Table VI-A, the silica filler is Hi-Sil (trademark) 215, a precipitated amorphous hydrated silica; mercapto silane is mercaptopropyltrimethoxysilane (used as a coupling agent); Delac MOR is N-oxydiethylene benzothiazole-2-sulfenamide; P.V.I. is N-cyclohexylphthalylimide; the other ingredients are identified in Examples I and II. The procedure for mixing, curing and testing the blends is as in Examples I and II. The results are shown in Table VI-B.

TABLE IV-A
EXAMPLE VI--EPDM-SBR DUMPER COMPOUNDS

| Stock: | VI-1 | VI-2 | VI-3 | VI-4 |
|---|---|---|---|---|
| Recipe | | | | |
| Silica filler | 20 | 20 | 20 | 25 |
| Mercapto Silane | .3 | .3 | .3 | .36 |
| Carbon black | 90 | 90 | 90 | 110 |
| Extender oil | 45 | 45 | 45 | 57 |
| Sulfur | 7 | 7 | 7 | 7 |
| Stearic acid | 1 | 1 | 1 | 1 |
| SBR | 20 | 20 | 20 | 20 |
| EPDM-II | 80 | — | — | — |
| EPDM-I | — | 80 | — | — |
| EPD-MIII | — | — | 80 | 80 |
| Zinc oxide | 5 | 5 | 5 | 5 |
| Delac MOR | 1.5 | 1.5 | 1.5 | 1.5 |
| P.V.I. | .5 | .5 | .5 | .5 |
| DPG | .5 | .5 | .5 | .5 |

TABLE VI-B
EXAMPLE VI (Cont'd.) EPDM-SBR BUMPER COMPOUNDS

| Stock: | VI-1 | VI-2 | VI-3 | VI-4 |
|---|---|---|---|---|
| Variables | | | | |
| Silica filler | 20 | 20 | 20 | 25 |
| Carbon black | 90 | 90 | 90 | 110 |
| Extender oil | 45 | 45 | 13 | 25 |
| EPDM-II | 80 | — | — | — |
| EPDM-I | — | 80 | — | — |
| EPDM-III (oil extended) | — | — | 112 | 112 |
| Physical Properties--Press Cure 8 min. at 360° F. | | | | |
| 10% Modulus | 430 | 380 | 410 | 420 |
| Tensile | 770 | 1450 | 2040 | 1650 |
| Elongation | 190 | 160 | 220 | 220 |
| Hardness | 82 | 85 | 90 | 92 |
| Flexural modulus | .20 | .12 | .18 | .22 |
| Physical Properties--Post Cure 1½ hours at 250° F. | | | | |
| 10% Modulus | 490 | 440 | 570 | 520 |
| Tensile | 910 | 1500 | 2160 | 1810 |
| Elongation | 180 | 150 | 210 | 170 |
| Hardness | 88 | 85 | 86 | 89 |
| Flexural modulus | .28 | .22 | .20 | .24 |

EXAMPLE VII

This example illustrates automotive facia panel compounds. Four blends are prepared according to the recipes shown in Table VII-A. EPDM-I is as previously identified, EPDM-IV has the following characteristics: 70% ethylene, 25% propylene, 5% ENB, intrinsic viscosity 2.3, Mooney 78 ML-4 at 125° C. The other ingredients and the procedure are as previously described. The results shown in Table VII-B demonstrate that even blends VII-3 and VII-4 carrying higher amounts of extenders (oil and carbon black), which are very economical, show surprisingly high tensile and elongation values. Paint adheres well to the cured facia panel compositions of this example.

TABLE VII-A
EXAMPLE VII--EPDM-SBR FACIA PANEL COMPOUNDS

| Stock: | VII-1 | VII-2 | VII-3 | VII-4 |
|---|---|---|---|---|
| Recipe | | | | |
| Silica filler | 20 | 20 | 20 | 20 |
| Mercapto silane | .3 | .3 | .3 | .3 |
| Carbon black | 90 | 90 | 90 | 100 |
| Extender oil | 45 | 45 | 55 | 60 |
| Sulfur | 7 | 7 | 7 | 7 |
| Stearic acid | 1 | 1 | 1 | 1 |
| SBR | 20 | 20 | 20 | 20 |
| EPDM-I | 80 | — | — | — |
| EPDM-IV | — | 80 | 80 | 80 |
| Zinc oxide | 5 | 5 | 5 | 5 |

TABLE VII-A-continued

EXAMPLE VII--EPDM-SBR FACIA PANEL COMPOUNDS

| Stock: | VII-1 | VII-2 | VII-3 | VII-4 |
|---|---|---|---|---|
| Delac MOR | 1.5 | 1.5 | 1.5 | 1.5 |
| P.V.I. | .5 | .5 | .5 | .5 |
| DPG | .5 | .5 | .5 | .5 |

TABLE VII-B

EXAMPLE VII (Cont'd.) EPDM-SBR FACIA PANEL COMPOUNDS

| Stock: | VII-1 | VII-2 | VII-3 | VII-4 |
|---|---|---|---|---|
| Variables | | | | |
| EPDM-I | 80 | — | — | — |
| EPDM-IV | — | 80 | 80 | 80 |
| Carbon black | 90 | 90 | 90 | 100 |
| Extender oil | 45 | 45 | 55 | 60 |
| Properties Press Cure 8 min. at 360° F. | | | | |
| 10% Modulus | 350 | 430 | 320 | 340 |
| Tensile | 1460 | 2110 | 1870 | 1770 |
| Elongation | 160 | 240 | 250 | 250 |
| Hardness | 87 | 90 | 86 | 89 |
| Flexural modulus | .17 | .19 | .12 | .15 |
| Post Cure 1¼ hours at 250° F. | | | | |
| 10% Modulus | 380 | 400 | 370 | 370 |
| Tensile | 1600 | 2120 | 1830 | 1770 |
| Elongation | 150 | 210 | 220 | 240 |
| Hardness | 91 | 90 | 87 | 87 |
| Flexural modulus | .20 | .20 | .15 | .17 |

We claim:

1. A painted exterior automotive body part which is a shaped article made of a vulcanized elastomeric composition comprising a blend of (A) an ungrafted elastomeric monoolefin copolymer rubber of low unsaturation with (B) a highly unsaturated conjugated diolefin polymer rubber, and (C) sulfur, the said monoolefin copolymer rubber (A) of low unsaturation being a binary copolymer or a terpolymer of:

(a) ethylene;

(b) a monoolefin having the structure $CH_2\!=\!CH\!-\!R$ wherein R is an alkyl radical having from 1 to 12 carbon atoms, the ratio of (a) to (b) being from 90/10 to 50/50 by weight; and (c) from 0 to 15%, based on the weight of (A), of a copolymerizable polyene;

the said highly unsaturated rubber (B) being a polymer containing at least 50% by weight of conjugated diolefin, the ratio of (A) to (B) in the blend being from 70:30 to 85:15 by weight, and the amount of (C) being from 6 to 12 parts per 100 parts by weight of (A) plus (B), said composition having a flexural modulus of from 4,000 to 75,000 psi and a 10% modulus of from 100 to 1,800 psi, and an elongation of from 25 to 250%, the paint on the surface of said article adhering thereto sufficiently firmly that the painted article passes the cross hatch, water immersion, galvanic action and thermal shock automotive industry tests referred to herein.

2. A painted exterior automotive body part as in claim 1 in which (A) is an ethylene-propylene-non-conjugated diene terpolymer and (B) is butadiene-styrene copolymer rubber.

3. A painted exterior automotive body part as in claim 2 in which the blend further contains 90 to 110 parts by weight of carbon black and 45 to 60 parts by weight of extender oil per 100 parts by weight of (A) plus (B).

* * * * *